UNITED STATES PATENT OFFICE.

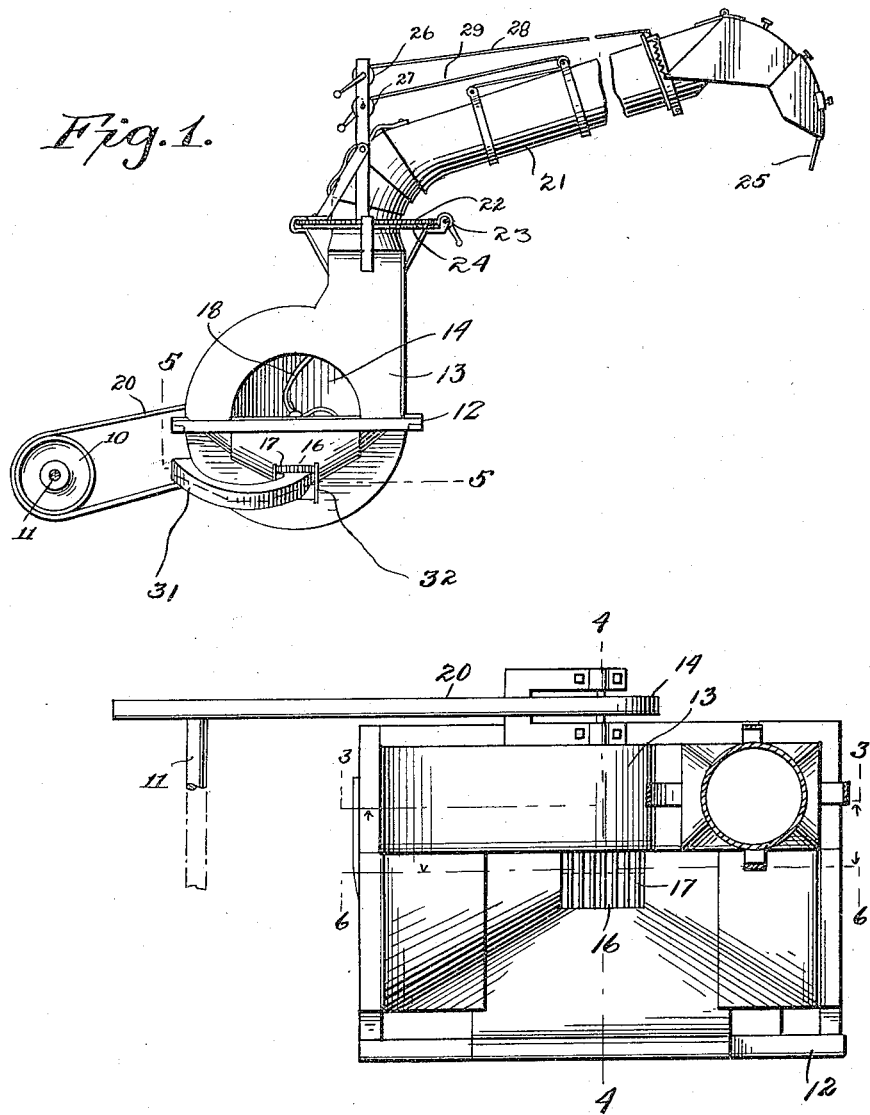

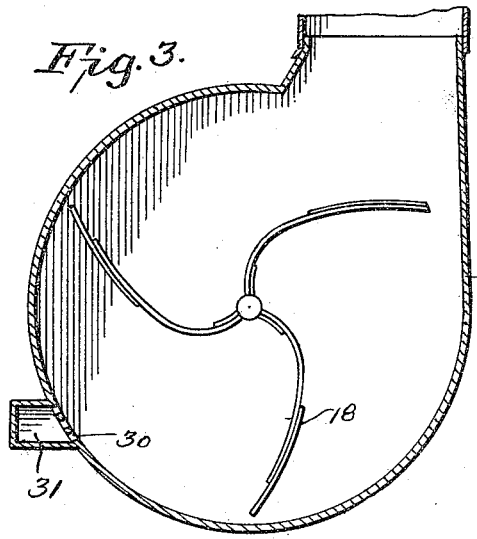
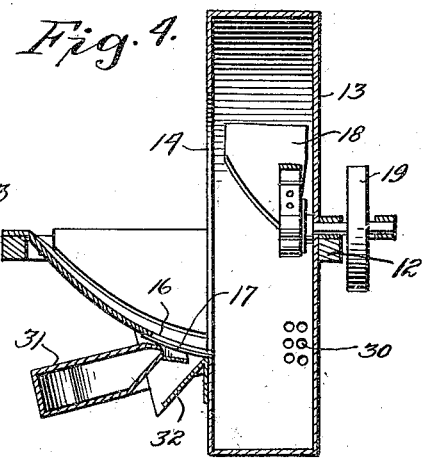
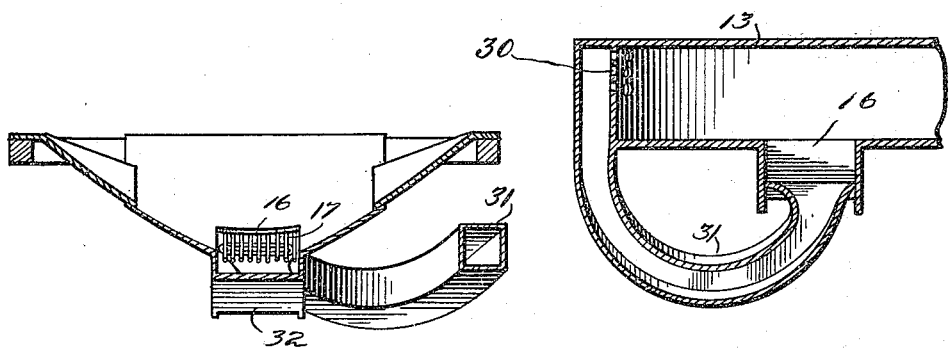

FRANK J. MacDONALD, OF WARNERVILLE, NEW YORK.

STACKER.

1,214,565.  Specification of Letters Patent.  Patented Feb. 6, 1917.

Application filed October 12, 1915. Serial No. 55,463.

*To all whom it may concern:*

Be it known that I, FRANK J. MAC-DONALD, a citizen of the United States, residing at Warnerville, in the county of Schoharie, State of New York, have invented certain new and useful Improvements in Stackers; and I do hereby declare the following to be a full, clear, and exact description of the invention, such as will enable others skilled in the art to which it appertains to make and use the same.

This invention relates to improvements in stackers and particularly to pneumatic stackers.

The principal object of the invention is to provide a device in which the grain usually lost as the straw is blown up through the tube, may be saved.

Other objects reside in the peculiar construction and arrangement of the various parts which combine to perform the functions desired.

In the drawing: Figure 1 is a side elevation of my improved stacking device, Fig. 2 is a top plan view, Fig. 3 is a longitudinal section on the line 3—3 of Fig. 2, Fig. 4 is a transverse section on the line 4—4 of Fig. 2, Fig. 5 is a horizontal section on the line 5—5 of Fig. 1, and Fig. 6 is a longitudinal section on the line 6—6 of Fig. 2.

Referring particularly to the accompanying drawing, 10 represents a pulley or belt wheel mounted on the cylinder shaft 11 of a threshing machine. On the said machine is mounted a frame 12 which supports a fan casing 13 having an opening 14 in one side to receive the straw from the hopper carried by the said frame 12. This hopper inclines longitudinally downwardly and inwardly and inwardly transversely, the lowest point being formed with an opening 16 over which is disposed a grating 17. Mounted in the casing 13 is the fan 18 which has on the outer end of its shaft a pulley 19 which is driven from the cylinder shaft 11 by a belt 20. Connected to the upper side of the casing 13 is the stacker tube 21, the same being mounted on a turn table 22 rotatable by means of the worm or screw pinions 23 and 24. The stacker tube is provided with an adjustable guard grating 25 at its outer end and with winding drums 26 and 27, and the complementary cables 28 and 29 for raising and lowering the tube and for extending or retracting the same. In the opposite lower side of the casing 13 there are formed a plurality of openings 30. Extending from these openings to a point beneath the opening 16 is an air conducting pipe 31 which conveys air from the casing 13 and discharges the same upwardly through the grating 17 so as to separate any grain which might be in the straw and permit the same to fall through the grating. Disposed below the grating and the adjacent end of the pipe 31 is a chute 32 beneath which a suitable receptacle can be placed to catch the grain as it falls through the grating.

What is claimed is:

A grain saving device for a stacker comprising a fan casing having an opening in one side, one edge of the casing having a plurality of air outlet openings, a hopper mounted at one side of the casing in position to discharge material through the opening, the bottom of the hopper having an outlet opening and a spout therebelow, said spout inclining downwardly away from the casing, a grating over the opening in the hopper and an air conducting pipe having one end secured to the casing and covering the said plurality of openings and the other end having a nozzle arranged beneath the grating in position to discharge a blast of air upwardly through the grating; and inwardly toward the straw opening of the fan casing.

In testimony whereof, I affix my signature, in the presence of two witnesses.

FRANK J. MacDONALD.

Witnesses:
WM. H. GOLDING,
LILLIAN W. KLING.

Copies of this patent may be obtained for five cents each, by addressing the "Commissioner of Patents, Washington, D. C."